United States Patent
Kwon et al.

(10) Patent No.: US 8,271,625 B2
(45) Date of Patent: Sep. 18, 2012

(54) METHOD AND APPARATUS FOR SYNCHRONIZING CONTENTS OF HOME NETWORK DEVICES

(75) Inventors: Won-seok Kwon, Suwon-si (KR); Joo-yeol Lee, Seoul (KR); Seung-jae Oh, Seoul (KR); Dong-shin Jung, Suwon-si (KR); Se-hee Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 672 days.

(21) Appl. No.: 11/734,125

(22) Filed: Apr. 11, 2007

(65) Prior Publication Data
US 2007/0239864 A1 Oct. 11, 2007

Related U.S. Application Data

(60) Provisional application No. 60/790,804, filed on Apr. 11, 2006.

(30) Foreign Application Priority Data

Nov. 30, 2006 (KR) ........................ 10-2006-0120067

(51) Int. Cl.
*G06F 15/16* (2006.01)
*G06F 15/173* (2006.01)

(52) U.S. Cl. ......... 709/221; 709/201; 709/217; 709/223

(58) Field of Classification Search .......... 709/201–203, 709/248
See application file for complete search history.

(56) References Cited

U.S. PATENT DOCUMENTS

| | | | |
|---|---|---|---|
| 7,133,423 B1 | 11/2006 | Chow et al. | |
| 2003/0037254 A1* | 2/2003 | Fischer et al. | 713/200 |
| 2003/0191827 A1* | 10/2003 | Piispanen et al. | 709/221 |
| 2004/0139180 A1* | 7/2004 | White et al. | 709/221 |
| 2004/0221007 A1* | 11/2004 | Roe et al. | 709/203 |
| 2005/0021866 A1* | 1/2005 | Kang et al. | 709/248 |
| 2005/0050181 A1* | 3/2005 | Morioka | 709/221 |
| 2005/0055352 A1* | 3/2005 | White et al. | 707/10 |
| 2005/0099498 A1 | 5/2005 | Lao et al. | |
| 2005/0135341 A1* | 6/2005 | Kim | 709/202 |
| 2005/0138137 A1* | 6/2005 | Encarnacion et al. | 709/217 |
| 2005/0171939 A1 | 8/2005 | Fisher et al. | |
| 2005/0210119 A1* | 9/2005 | Kumar | 709/217 |

(Continued)

FOREIGN PATENT DOCUMENTS

CN 1538701 A 10/2004

(Continued)

OTHER PUBLICATIONS

Japanese Office Action, dated Mar. 15, 2011, issued in Application No. 2009-505296.

(Continued)

*Primary Examiner* — Ian N Moore
*Assistant Examiner* — Jenee Alexander
(74) *Attorney, Agent, or Firm* — Sughrue Mion, PLLC

(57) ABSTRACT

A method and apparatus for synchronizing contents of devices in a home network are provided. The apparatus includes a determination unit which determines whether a first device and a second device support a common synchronization protocol. A synchronization request unit then requests at least one device to synchronize the contents using the common synchronization protocol determined by the determination unit.

40 Claims, 8 Drawing Sheets

U.S. PATENT DOCUMENTS

| | | | |
|---|---|---|---|
| 2005/0267946 A1* | 12/2005 | An et al. | 709/217 |
| 2006/0089981 A1* | 4/2006 | Ahn et al. | 709/221 |
| 2006/0168126 A1* | 7/2006 | Costa-Requena et al. | 709/219 |
| 2007/0005727 A1* | 1/2007 | Edwards et al. | 709/218 |
| 2007/0019683 A1* | 1/2007 | Kryzyanowski | 370/503 |
| 2007/0162518 A1 | 7/2007 | Tian | |

FOREIGN PATENT DOCUMENTS

| | | |
|---|---|---|
| JP | 2001346144 A | 12/2001 |
| JP | 2004193868 A | 7/2004 |
| KR | 1020050031466 A | 4/2005 |
| KR | 1020050108181 A | 11/2005 |
| KR | 10 2006 0106613 A | 10/2006 |
| KR | 10 2007 0010727 A | 1/2007 |
| WO | WO 03107597 A1 | 12/2003 |
| WO | WO 2005069521 A1 | 7/2005 |
| WO | 2005076914 A2 | 8/2005 |
| WO | 2006/018717 A1 | 2/2006 |
| WO | 2006032214 A1 | 3/2006 |

OTHER PUBLICATIONS

Communication dated Feb. 7, 2012 issued by the Japanese Patent Office in Japanese Application No. 2009-505296.

Communication dated Apr. 6, 2012 issued by The State Intellectual Property Office of P.R. China in Chinese Application No. 200780013008.

Communication dated Oct. 25, 2007 issued by the Korean Intellectual Property Office in Korean Application No. 10-2006-0120067.

Communication dated Aug. 3, 2012 issued by the Intellectual Property Office of P.R. China in counterpart Chinese Patent Application No. 200780013008.X.

* cited by examiner

FIG. 5

```
<item id='23' parentid='14' restricted='1'>
 <dc:title>Wonseok's Music Sync.</dc:title>
 <upnp:class>object.item.syncItem</upnp:class>
 <upnp:syncContainer>19</upnp:syncContainer>
 <upnp:remoteSyncObject>
   <upnp:deviceUDN serviceType='ContentDirectory2' serviceId='ContentDirectory'>
      uuid:12345678-1234-5678-9012-123456789012</upnp:deviceUDN>
   <upnp:syncObjectId>obj-45</upnp:syncObjectId>
 </upnp:remoteSyncObject>
<upnp:syncProtocol> SyncML, AtomicSync, SSync</upnp:syncProtocol>
</item>
```

FIG. 6

```
<?xml version="1.0" encoding="UTF-8"?>
<Features
  xmlns="urn:schemas-upnp-org:avwc:avs"
  xmlns:xsi="http://www.w3.org/2001/XMLSchema-instance"
  xsi:schemaLocation="
urn:schemas-upnp-org:avwc:avs
   http://upnp.org/standardizeddcps/schemas/avwc/avs/1.00">
  <Feature name="SYNC" version="1"/>
</Features>
```

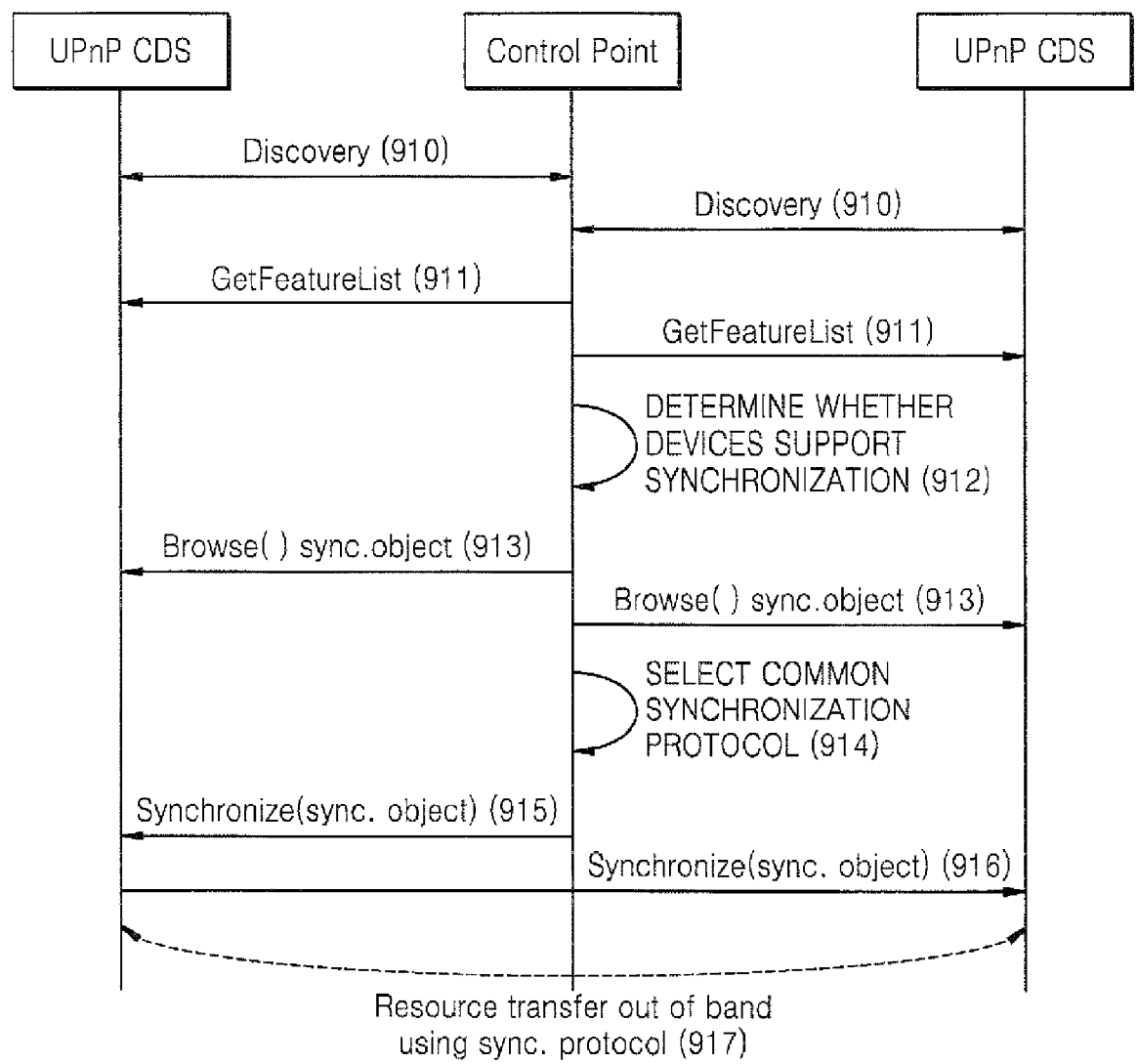

METHOD AND APPARATUS FOR SYNCHRONIZING CONTENTS OF HOME NETWORK DEVICES

CROSS-REFERENCE TO RELATED PATENT APPLICATION

This application claims the benefit of U.S. Provisional Patent Application No. 60/790,804 filed on 11 Apr. 2006 in the U.S. Patent Trademark Office, and priority from Korean Patent Application No. 10-2006-0120067 filed on 30 Nov. 2006, in the Korean Intellectual Property Office, the disclosures of which are incorporated herein in their entirety by reference.

BACKGROUND OF THE INVENTION

1. Field of the Invention

Apparatuses and methods consistent with the present invention relate to a home network, and more particularly, to a method and apparatus for synchronizing contents provided by content directory services of Universal Plug and Play (UPnP) devices.

2. Description of the Related Art

Universal Plug and Play (UPnP), which is a type of protocol that discovers and controls electric devices connected to a network, has been considered as a standard protocol for home networking. UPnP Audio/Video (AV) is a UPnP-based technique whereby multimedia content, such as audio or video, can be used via a network.

The UPnP AV architecture includes a media server, a media renderer, and a control point that controls them. The media server is a device that provides a multimedia file via a content directory service (CDS), and the media renderer is a device that reproduces the multimedia file provided by the media server. The control point controls the media server and the media renderer so that they can operate interactively with each other. When the UPnP AV architecture is built, a plurality of media servers may be present in a home network, and the media servers may store different pieces of content. In such an environment, a user of UPnP AV is likely to require that a plurality of pieces of content that are scattered in different CDSs be easily synchronized. For example, the user may desire to synchronize his/her MP3 player with a home media center to play the music using a Hi-Fi device in order to evaluate the high pitch tones of the music content stored in the MP3 player.

FIG. 1 is a conceptual diagram schematically illustrating a method of synchronizing contents between UPnP devices in the related art. A user selects devices to be synchronized using a control point 100, and performs synchronization by controlling CDS 101 and CDS 102, which are respectively provided by the devices, so as to transmit contents between the devices.

FIG. 2 is a detailed flowchart illustrating a method of synchronizing contents between UPnP devices in the related art. Hereinafter, it is assumed that two UPnP devices are present and each CDS is provided by different UPnP devices.

In operation 201, the control point selects devices that are to be synchronized and calls a browse( ) action of a CDS that each of the devices provides so as to obtain a list of content. In operation 202, the lists of content of both devices are compared and the control point determines which object will be added to, deleted from, or changed in the selected devices in order to match the contents. Here, the object includes all types of data entities that a CDS can return as a result of calling the browse( ) action or a search( ) action. Thus, the object may be meta data of content, or a resource binary representing the content.

In operations 203 and 204, the control point deletes or adds contents using actions provided by the CDS of each device. More specifically, the control point controls a content directory service to obtain new content using a HTTP GET command by calling a CreateObject( ) action and an ImportResource( ) action of the content directory service to which the new content is to be added.

A DestroyObject( ) action and a DeleteResource( ) action are used to delete content, and an UpdateObject( ) action is used to modify meta data of content.

As described above, when synchronization of UPnP AV devices is performed using UPnP as in the related art, all content lists of the CDSs of all the devices must be searched in order to select an object that needs to be synchronized. Thus, when the amount of content is large, load on a memory or central processing unit (CPU) of the control point is significantly increased.

Also the more objects that are to be synchronized, the more frequently an action of a CDS is called, and the more network traffic is generated, thereby reducing the speed of synchronization.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above. The present invention provides a method and apparatus for reducing the frequency of a call of a Universal Plug and Play (UPnP) action and synchronizing contents between UPnP devices using a separate synchronization protocol.

According to an aspect of the present invention, there is provided a method of synchronizing content of a first device and content of a second device performed by a control point, the method including: determining whether the first and second devices support a common synchronization protocol which can be used in synchronizing the contents; and selectively requesting at least one device to synchronize the contents by using the common synchronization protocol based on the determination result.

The determining may be performed based on Browse( ) responses of Content Directory Service (CDS) provided by the first and second devices, information on the synchronization protocol(s) which can be used to synchronize a first object that corresponds to the content of the first device is included in meta data of the first object, and information on the synchronization protocol(s) which can be used in synchronizing a second object that corresponds to the content of the second device is included in meta data of the second object.

The requesting may include calling a synchronization action provided by the CDS of the first device or the second device.

The method may further include identifying whether the CDS of the first and second devices provide the synchronization action.

The identifying may be performed based on a GetFeatureList( ) response provided by the CDS of the first and second devices.

According to another aspect of the present invention, there is provided a computer readable medium having embodied thereon a computer program for the method described above.

According to another aspect of the present invention, there is provided a control point apparatus for synchronizing content of a first device and content of a second device, the apparatus including: a determination unit which determines whether the first and second devices support a common synchronization protocol which can be used to synchronize the contents; a synchronization requesting unit which selectively requests at least one device to synchronize the contents by using the common synchronization protocol based on the determination result.

According to another aspect of the present invention, there is provided a method of synchronizing content of a first device with content of a second device in a home network, the method including: registering information on a second object which corresponds to the content of the second device, identification of the second device, and synchronization protocol(s) which can be used to synchronize a first object that corresponds to the content of the first device, as meta data of the first object; receiving a request to synchronize the first object from the control point; and synchronizing the first and second objects according to one of the synchronization protocol(s) and referring to information on the second object and identification of the second device as a response to the request.

The receiving may be a process of receiving a message for calling a synchronization action defined in the CDS of the first device.

The synchronizing may include calling a synchronization action defined in the CDS of the second device in order for the second device to obtain update information of the first object.

The method may further include informing the control point that the CDS of the first device can provide the synchronization action.

The informing may be performed by using a GetFeatureList( ) response defined in the CDS of the first device.

According to another aspect of the present invention, there is provided a computer readable medium having embodied thereon a computer program for executing the method described above.

According to another aspect of the present invention, there is provided an apparatus for synchronizing content of a first device with content of a second device in a home network, the apparatus including: an object managing unit which registers information on a second object which corresponds to the content of the second device, identification of the second device, and synchronization protocol(s) which can be used to synchronize a first object that corresponds to the content of the first device, as meta data of the first object; a request receiving unit which receives a request to synchronize the first object from a control point; and a synchronizing unit which synchronizes the first and second objects according to one of the synchronization protocol(s) and referring to information on the second object and identification of the second device as a response to the request.

BRIEF DESCRIPTION OF THE DRAWINGS

The above and other aspects and features of the present invention will become more apparent by describing in detail exemplary embodiments thereof with reference to the attached drawings in which:

FIG. 5 is a diagram of a content directory service (CDS) object that is produced by a device according to an exemplary embodiment of the present invention;

FIG. 6 is a diagram of a GetFeatureList( ) response message according to an exemplary embodiment of the present invention;

FIG. 9 is a flowchart illustrating a synchronizing operation according to an exemplary embodiment of the present invention.

DETAILED DESCRIPTION OF THE INVENTION

Hereinafter, the present invention will be described more fully with reference to the accompanying drawings, in which exemplary embodiments of the invention are shown.

Figure 1:
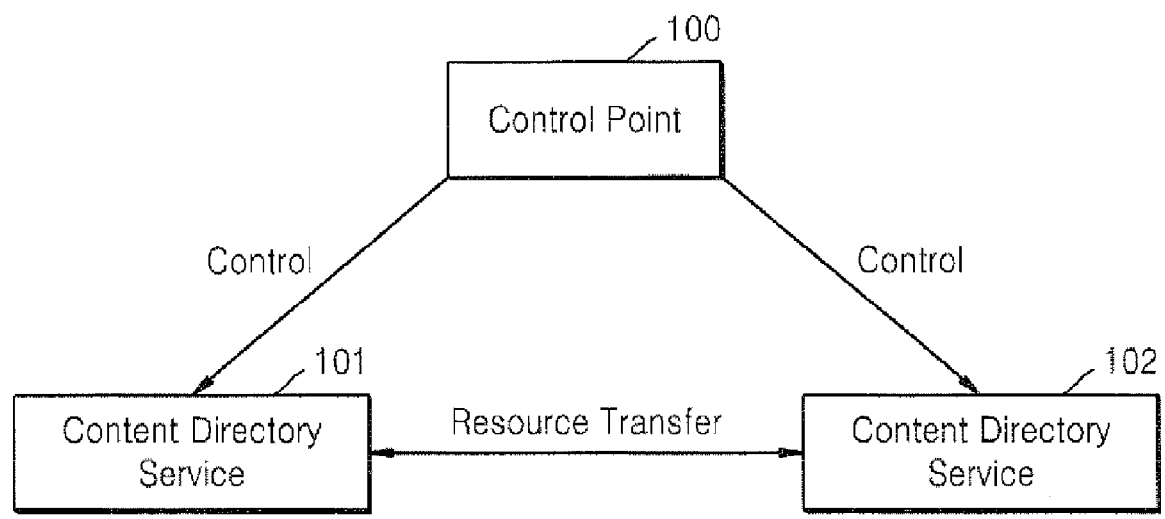
FIG. 1 is a conceptual diagram schematically illustrating a method of synchronizing contents between Universal Plug and Play (UPnP) devices in the related art.
Figure 2:
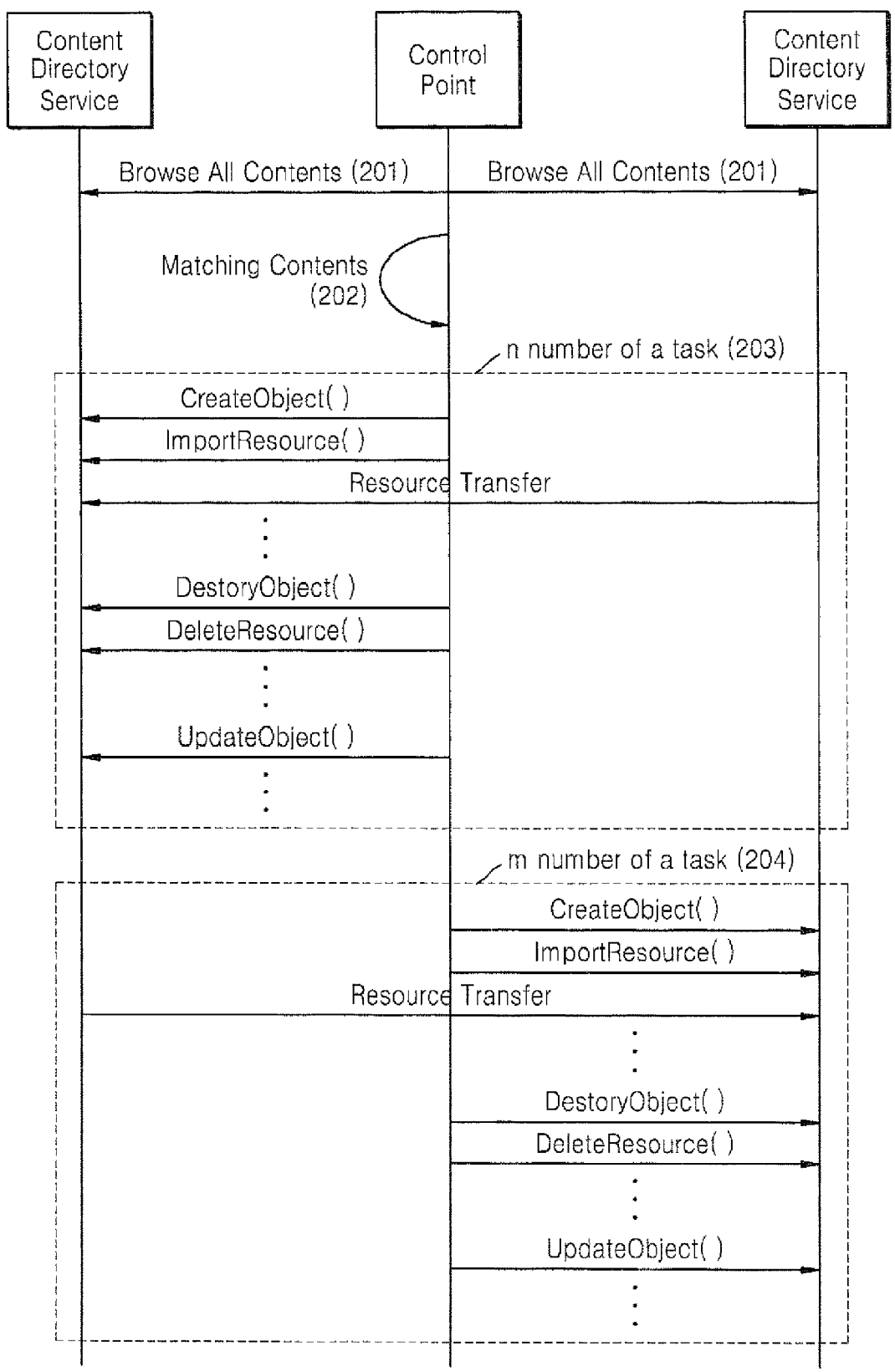
FIG. 2 is a detailed flowchart illustrating a method of synchronizing contents between UPnP devices in the related art.
Figure 3:
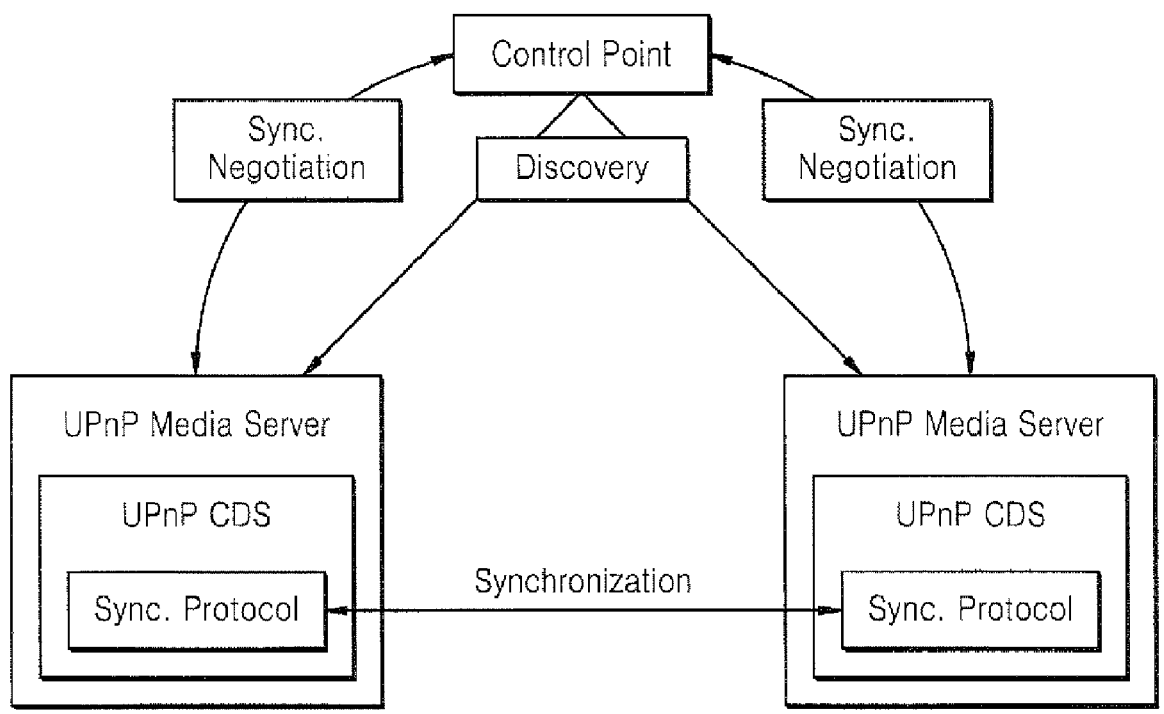
FIG. 3 is a block diagram for explaining a principle of synchronizing contents between devices according to an exemplary embodiment of the present invention.

FIG. 3 is a block diagram for explaining a principle of synchronizing contents between devices according to an exemplary embodiment of the present invention. Hereinafter, a Universal Plug and Play (UPnP) media server which provides a content directory service (CDS) can be used with a device as same meaning.

As illustrated in FIG. 3, a control point discovers UPnP media servers in a UPnP based home network and determines which CDS object (hereinafter, referred to as an object) will be synchronized and which synchronization policy will be used, using the CDS of both media servers (synchronization negotiation). Also, the control point searches for a synchronization protocol that is supported by the devices. The synchronization protocol may vary according to the type of content, even if the content is included in the same device. For example, a synchronization protocol that specializes in mp3 files and a synchronization protocol that specializes in moving picture files may be present.

After synchronization negotiation is completed, the control point instructs at least one media server to synchronize the specific object using a specific protocol. In this case, a request to synchronize is made by calling an action defined in the CDS. The control point selects a synchronization protocol that both media servers commonly provide to make the request. The media server, which receives the instruction to synchronize, refers to a property of a corresponding object to select a partner device and an object to be synchronized with the partner device by using a synchronization protocol selected by the control point. Therefore, a home network device according to an exemplary embodiment of the present invention, that is, a media server which provides the CDS, may represent an identifier of the partner device which corresponds to each object and information on an object of the partner device to be synchronized, with respect to each object owned by the CDS of the media server, as a property of the corresponding object in the form of meta data. Also, information on synchronization protocols which may be used with respect to each object should represent metadata of corresponding objects.

In other words, the control point only makes a request to the device for selecting a specific object and synchronizing in a synchronizing process and, thereafter, a substantial synchronizing process is performed using common synchronization protocols of the devices without the control point's intervention, thereby enabling the reduction of the calling frequency of an action provided by the CDS. Therefore, the CDS provided by the device should provide an action which triggers synchronization with respect to the specific object by using a synchronization protocol.

Figure 4:
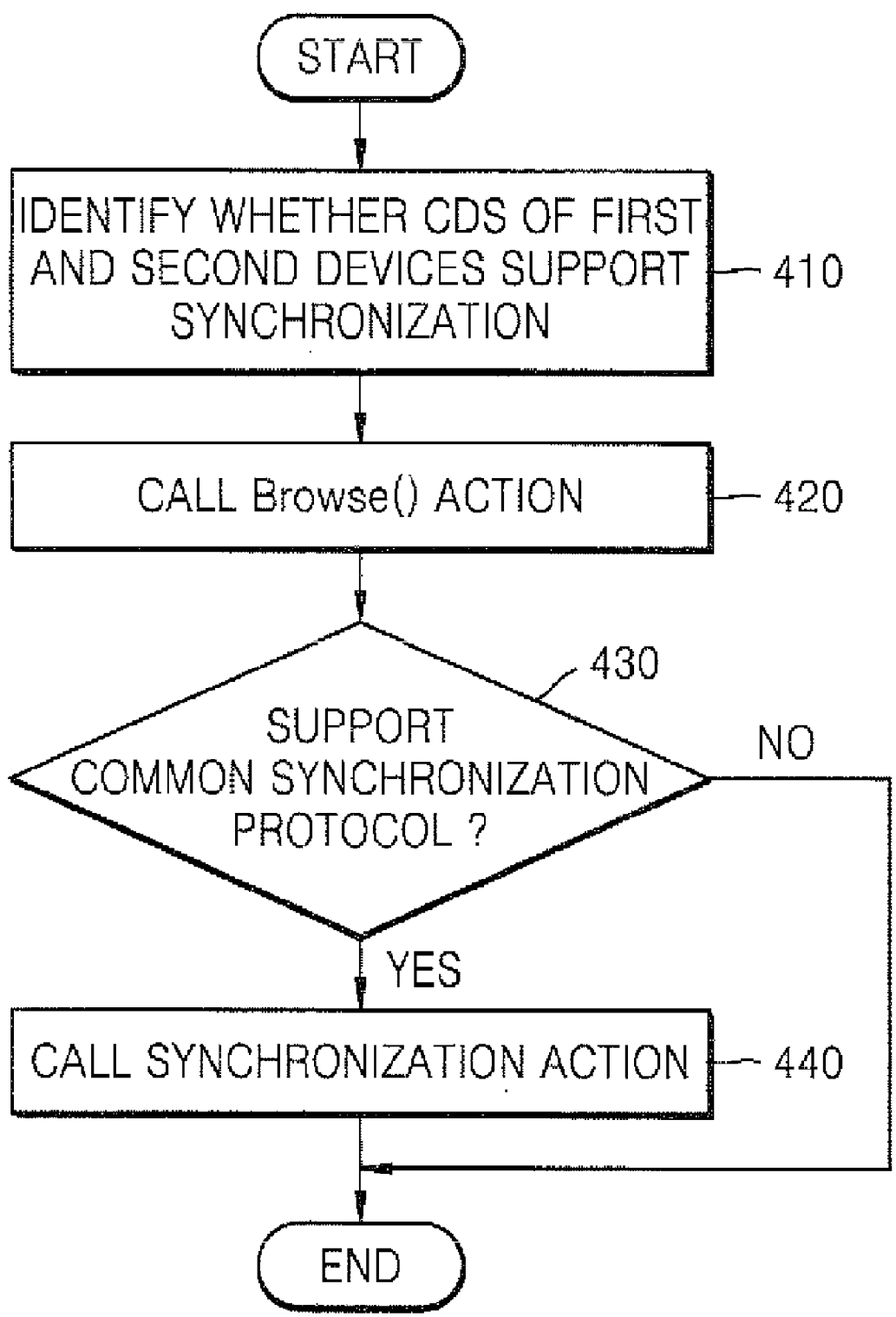
FIG. 4 is a flowchart illustrating operations of synchronizing contents between devices by using a control point according to an exemplary embodiment of the present invention.

FIG. 4 is a flowchart illustrating operations of synchronizing contents between devices by using the control point according to an exemplary embodiment of the present invention.

In operation 410, the control point identifies whether the CDS of a first device and a second device will support a synchronization process. Here, GetFeatureList( ) provided by the CDS may be used. Therefore, the CDS of the device may include a GetFeatureList( ) response message having information on whether synchronization is supported. The GetFeatureList( ) response message is illustrated in FIG. 6.

In operation 420, the control point calls a Browse( ) action provided by the CDS of the devices. As described above, the CDS of the device manages information on an identifier of the partner device, an object to be synchronized, and a synchronization protocol which will be used in synchronizing the corresponding object, as meta data of the corresponding object, and thus, such information may be included in the Browse( ) response message.

In operation 430, the control point refers to the Browse( ) response message and determines whether the first and second devices support a synchronization protocol which can be used to synchronize the objects. In other words, the control point determines whether at least one common protocol is present which can be used to synchronize each object to be synchronized. If at least one common protocol is present, synchronization is performed in operation 440.

In operation 440, the control point requests at least one device to select a synchronization protocol and objects that are to be synchronized and synchronizes the objects. Such a request is performed by calling a synchronization action defined in the CDS. When the synchronization is triggered according to a call of a synchronization action, the device synchronizes according to the synchronization protocol selected by the control point.

According to a method of another exemplary embodiment, the control point may trigger a synchronization action in all of first and second devices or may trigger a synchronization action in only a single device. More specifically, in the latter case, when the control point requests the first device to synchronize a specific object, the first device refers to meta data of a corresponding object and determines the second device and the object to be synchronized. Then, the first device receives updating information on the object of the second device to be synchronized by means of a HTTP GET command and calls a synchronization action of the second device so that the second device gets updating information on its own object. The devices having updating information for each other update content by using a common synchronization protocol.

FIG. 5 is a diagram of the CDS object that is produced by the device according to an exemplary embodiment of the present invention.

As described in FIG. 5, a property of the object (item) having an identification (ID) of 23 includes information on identification of the partner device and the object of the partner device to be synchronized. That is, the device which receives a request for synchronizing determines the partner device and service using a deviceUDN value of the partner device, service type, and service ID and synchronizes the object No. 45 of a corresponding service with its own object No. 23.

Meanwhile, as illustrated in the lower part of FIG. 5, synchronization protocols SyncML, AtomicSync, and SSync which can be used in synchronizing the object No. 23 are illustrated under the tag of <upnp:syncProtocol>. Information illustrated in FIG. 5 is included in the Browse( ) response message and transmitted to the control point and, thus, the control point can identify whether a synchronization protocol, which can be commonly used in a plurality of objects that are to be synchronized, is present.

FIG. 6 is a diagram of a GetFeatureList( ) response message according to an exemplary embodiment of the present invention.

As described above, the device can provide information on whether the device supports synchronization to the control point through a GetFeatureList( ) response.

When the device supports synchronization, information illustrating whether to support the synchronization, such as <Feature name="SYNC" version="1"/>illustrated in FIG. 6 is added to the GetFeatureList( ) response.

Figure 7:
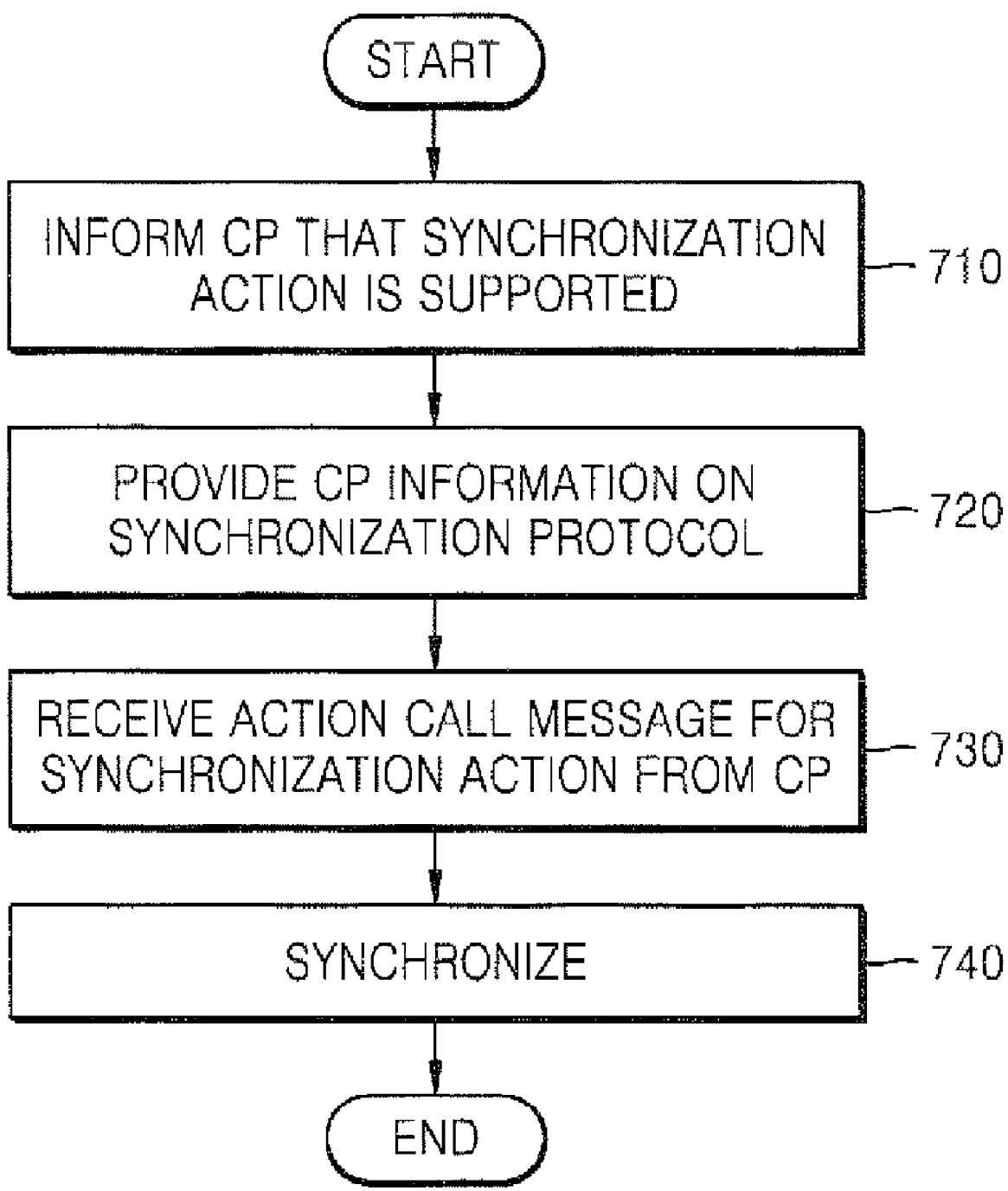
FIG. 7 is a flowchart illustrating operations of synchronizing a second device and contents with a first device according to an exemplary embodiment of the present invention.

FIG. 7 is a flowchart illustrating operations of synchronizing a second device and contents by using a first device according to an exemplary embodiment of the present invention.

In operation 710, the first device informs the control point that the first device supports a method of synchronizing. As described above, such an informing process can be performed by using a GetFeatureList( ) response.

In operation 720, the first device provides the control point with information on a protocol which can be used to synchronize the object owned by the first device. As described above, such a process can be performed by using a Browse( ) response.

In operation 730, the first device receives a request to synchronize a first object from the control point. Such a request is a process of calling a predetermined synchronization action provided by the CDS of the first device. The CDS of the first device manages information on the partner device with respect to the first object and information on an object to be synchronized as meta data of the first object. Thus, the control point only triggers an action for synchronizing the first object and is not concerned with a subsequent synchronizing process.

In operation 740, the first device refers to meta data of the object that is required to be synchronized and synchronizes with the second device by using the synchronization protocol designated by the control point.

In the present exemplary embodiment, it is assumed that meta data of the object includes information on the relative object and the object to be synchronized. However, the information may be expressed as meta data of the object at any time during the process.

Figure 8:
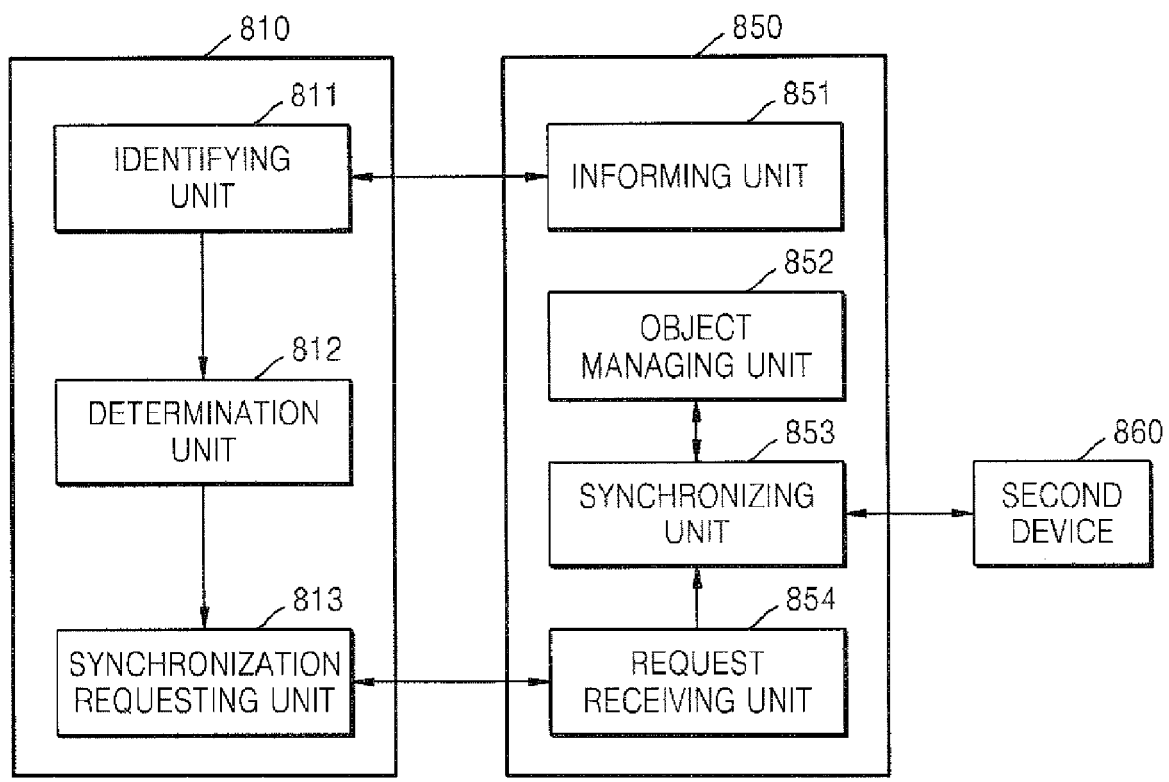
FIG. 8 is a diagram of a control point and a media server according to an exemplary embodiment of the present invention.

FIG. 8 is a diagram of the control point and the media server according to an exemplary embodiment of the present invention.

Hereinafter, it is assumed that the first object of the first device 850 and the second object of the second device 860 are synchronized, for convenience of description. However, the present invention is not intended to be so limited.

First, a control point 810, according to an embodiment of the present invention, includes an identifying unit 811, a determination unit 812, and a synchronization requesting unit 813.

The identifying unit 811 identifies whether the CDS of the first and second devices 850 and 860 support synchronization by using a GetFeatureList( ) action provided by the CDS of the first and second devices 850 and 860.

The determination unit 812 collects information on synchronization protocols which can be used for synchronizing the first object and the second object, respectively, by using a Browse( ) action provided by a CDS of the first and second devices 850 and 860 and determines whether a common synchronization protocol is present. The first device 850 and the second device 860 manage information on such synchronization protocols as meta data of the corresponding object and, thus, such meta data is included in the Browse( ) response message to be transmitted to the control point 810.

The synchronization requesting unit 813 requests the first device 850 to synchronize the first object. Such a request is a process of calling a synchronizing action provided by the CDS of the first device 850. Alternatively, as described above, according to a method according to an exemplary embodiment of the present invention, a request for synchronizing may be performed only for the first device 850 or for both the first and second devices 850 and 860.

Next, a media server, that is, the first device 850, includes an informing unit 851, an object managing unit 852, a synchronizing unit 853, and a request receiving unit 854.

The informing unit 851 informs the control point 810 whether a method of synchronizing is supported by using the GetFeatureList( ) response.

The object managing unit 852 represents information needed for synchronizing the first object, that is, information on a synchronization protocol which can be used to synchronize the first object, identification of the second device, and the second object to be synchronized, as meta data of the first object. Therefore, such information can be included in the Browse( ) response message and transmitted to the control point 810.

The request receiving unit 854 receives a request synchronize the first object from the control point 810. Such a request is made by calling a synchronization action provided by the CDS of the first device 850, and the request message includes information on which synchronization protocol should be used.

The synchronizing unit 853 synchronizes with the second device 860 according to synchronization protocol designated by the control point 810. Here, the synchronization protocol designated by the control point 810 is a common synchronization protocol from among synchronization protocols which can be used to synchronize the first object and the second object, respectively. Also, information on identification of the second device and the second object among meta data of the first object is referred to for synchronization.

In a synchronizing process, the synchronizing unit 853 receives information on updating the second object from the second device 860 through a HTTP GET command and calls a synchronization action of the second device 860 for the second device 860 to get information on updating of the first object through a HTTP GET command.

FIG. 9 is a flowchart illustrating synchronizing operation according to an exemplary embodiment of the present invention.

In operation 910, the control point discovers the CDS of UPnP devices.

In operation 911, the control point calls a GetFeatureList( ) action of the CDS of the UPnP devices so as to receive a response message for the action. In operation 912, it is determined whether the devices support a method of synchronizing based on the response message.

In operation 913, the control point calls a Browse( ) action of the CDS of the UPnP and receives a response message therefor.

In operation 914, the control point determines which synchronization protocol should be used to synchronize the objects of the devices based on the Browse( ) response. A synchronization protocol which can be commonly used in both objects may be selected.

In operation 915, the control point requests synchronization of a specific object by calling a synchronization action of the CDS of one side.

In operation 916, the CDS, which receives a synchronization request from the control point, calls a synchronization action provided by the CDS of the partner device.

In operation 917, the devices exchange resources needed for synchronizing according to a synchronization protocol designated by the control point.

As described above, since the media servers perform a synchronization process using an existing synchronization protocol, the frequency of calling an action of the CDS of the media servers by the control point can be reduced and, thus, speed of a synchronizing process may be increased.

The exemplary embodiments of the present invention can be written as computer programs and can be implemented in general-use digital computers that execute the programs using a computer readable recording medium. Examples of the computer readable recording medium include magnetic storage media (e.g., ROM, floppy disks, hard disks, etc.), optical recording media (e.g., CD-ROMs, or DVDs), and storage media such as carrier waves (e.g., transmission through the Internet).

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is

1. A method of synchronizing a first object stored in a first device with a second object stored in a second device by a control point in a Universal Plug and Play (UPnP) network, the method comprising:

storing first metadata of the first object in the first device along with the first object;

storing second metadata of the second object in the second device along with the second object;

determining a synchronization protocol supported by both the first device and the second device which can be used in synchronizing the first object and the second object based on Browse( ) responses of Content Directory Services (CDS) of the first device and the second device; and requesting the first device to synchronize the first object using the determined synchronization protocol by calling a predetermined synchronization action provided by the first device, wherein when the synchronization action is called, the first device synchronizes the first object with the second object using the determined synchronization protocol without further intervention of the control point, and a first Browse( ) response of the CDS of the first device includes information on a synchronization protocol which is available to be used to synchronize the first object as the first metadata of the first object, and a second Browse( ) response of the CDS of the second device includes information on a synchronization protocol which is available to be used to synchronize the second object as the second metadata of the second object.

2. The method of claim 1, wherein the synchronization action is defined in the CDS of the first device.

3. The method of claim 2, further comprising identifying whether the CDS of the first device or the second device provides the synchronization action.

4. The method of claim 3, wherein the identifying is performed based on a GetFeatureList( ) response provided by the CDS of the first device or the second device.

5. A non-transitory computer readable medium having embodied thereon a computer program for executing the method of claim 1.

6. The method of claim 1, further comprising, managing by a Content Directory Service (CDS) of the first device information on the second device with respect to the first object of the first device and information on the second object as the first metadata of the first object.

7. The method of claim 1, wherein the requesting includes sending a request from the control point to the first device, the request including information consisting of an identification of the first object, the determined synchronization protocol, and a call to a predetermined synchronization action provided by a Content Directory Service (CDS) of the first device.

8. The method of claim 1, wherein the first device is a first media server which stores objects, including the first object, and corresponding contents therein, and the second device is a second media server which stores objects, including the second object, and corresponding contents therein.

9. The method of claim 8, wherein the first object and the second object are stored in the first device and the second device, respectively, prior to the synchronizing.

10. The method of claim 8, wherein the first object and the second object are synchronized with each other through a communication link which directly connects the first device to the second device.

11. The method of claim 1, wherein the first metadata of the first object is attached to the first object.

12. The method of claim 1, wherein the first metadata is included in the first object, and the second metadata is included in the second object.

13. The method of claim 1, wherein the first metadata comprises an identifier of the second device, an identifier of the second object, and a first list of synchronization protocols available to synchronize the first object,
the second metadata comprises an identifier of the first device, an identifier of the first object, and a second list of synchronization protocols available to synchronize the second object; and
wherein the determining the synchronization protocol supported by both the first device and the second device comprises, by a control point, receiving the first list and the second list from the first device and the second device, respectively, comparing the first list and the second list, and determining a common synchronization protocol supported by both the first device and the second device as the determined synchronization protocol.

14. The method of claim 13, wherein, when the synchronization action is called, the first device extracts the identifier of the second device and the identifier of the second object from the first metadata, and calls another predetermined synchronization action provided by the second device corresponding to the extracted identifier of the second device and the extracted identifier of the second object,
and the first device and the second device exchange resources of the first object and the second object.

15. A control point apparatus for synchronizing a first object stored in a first device with a second object stored in a second device in a Universal Plug and Play (UPnP) network, the apparatus comprising:
a determination unit which receives a first Browse( ) response of Content Directory Services (CDS) of the first device which includes first information on a synchronization protocol which is available to be used to synchronize the first object as first metadata of the first object, receives a second Browse( ) response of the CDS of the second device which includes second information on a synchronization protocol which is available to be used to synchronize the second object as second metadata of the second object, and determines a synchronization protocol supported by both the first device and the second device which can be used to synchronize the first object and the second object based on the first information on the synchronization protocol provided by first metadata and the second information on the synchronization protocol provided by the second metadata; and
a synchronization requesting unit which requests the first device to synchronize the first object using the synchronization protocol determined by the determination unit by calling a predetermined synchronization action provided by the first device,
wherein when the synchronization action is called, the first device synchronizes the first object with the second object using the synchronization protocol without further intervention of the control point.

16. The apparatus of claim 15, wherein the requesting is performed by calling a synchronization action provided by a CDS of the first device or the second device.

17. The apparatus of claim 16, further comprising an identifying unit which identifies whether the CDSs of the first device and the second device provide the synchronization action.

18. The apparatus of claim 17, wherein the identifying unit identifies whether the synchronization action is provided based on a GetFeatureList( ) response provided by the CDSs of the first device and the second device.

19. The apparatus of claim 15, wherein the first device is a first media server which stores the content of the first device, and the second device is a second media server which stores the content of the second device, and the content of the first device and the content of the second device are synchronized with each other through a communication link which directly connects the first device to the second device after the first device receives the request.

20. The apparatus of claim 15, wherein the content of the first device and the content of the second device are stored in the first device and the second device, respectively, prior to the synchronizing.

21. A method of synchronizing a first object stored in a first device with a second object stored in a second device in a Universal Plug and Play (UPnP) network, the method comprising:
registering in the first device, by the first device, metadata of the first object, wherein the metadata of the first object comprises an identification of the second object stored in the second device, an identification of the second device, and at least one synchronization protocol which is available to be used to synchronize the first object of the first device;
transmitting, by the first device, information on the at least one synchronization protocol which is available to be used to synchronize the first object to a control point as the metadata of the first object via a Browse( ) response of a Content Directory Service (CDS) of the first device;
receiving, by the first device, a request to synchronize the first object from the control point according to one of the at least one synchronization protocol;
analyzing, by the first device, the metadata of the first object and determining, by the first device, the identification of the second device and the identification of the second object stored in the second device which is to be synchronized with the first object from the first metadata of the first object; and
synchronizing, by the first device, the first object and the second object according to one of the at least one synchronization protocol which is available to be used to synchronize the first object and based on the registered identification of the second object and the identification of the second device without further intervention of the control point.

22. The method of claim 21, wherein the receiving is a process of receiving a message for calling a synchronization action defined in a CDS of the first device.

23. The method of claim 21, wherein the synchronizing comprises calling, by the first device, a synchronization action defined in a CDS of the second device in order for the second device to obtain update information of the first object, wherein, the second device receives a call for the synchronization action from the first device, and upon receiving the call for the synchronization action, the second device:
transmits a request for updating information corresponding to the first object to the first device, wherein the request includes an identification of the first object stored in the first device, wherein the identification of the first object is retrieved from metadata of the second object registered in the second device,
receives the updating information corresponding to the first object from the first device, and
updates the second object based on the received updating information corresponding to the first object.

24. The method of claim 23, further comprising: informing the control point that a CDS of the first device can provide the synchronization action.

25. The method of claim 24, wherein the informing is performed by using a GetFeatureList( ) response defined in the CDS of the first device.

26. A non-transitory computer readable medium having embodied thereon a computer program for executing the method of claim 21.

27. The method of claim 21, wherein the control point, the first device and the second device are separate and distinct devices, and the first object and the second object are synchronized with each other through a communication link which directly connects the first device to the second device.

28. The method of claim 21, wherein the first device is a first media server which stores objects, including the first object, and corresponding contents therein, and the second device is a second media server which stores objects, including the second object, and corresponding contents therein.

29. The method of claim 28, wherein the first object and the second object are stored in the first device and the second device, respectively, prior to the synchronizing.

30. The method of claim 21, further comprising registering in the second device, by the second device, metadata of the second object, wherein the metadata of the second object includes an identification of the first object stored in the first device, an identification of the first device, and at least one synchronization protocol which is configured to synchronize the first object that corresponds to the content of the first device.

31. An apparatus for synchronizing a first object stored in a first device with a second object stored in a second device in a Universal Plug and Play (UPnP) network, the apparatus comprising:
an object managing unit of the first device which registers metadata of the first object, wherein the metadata of the first object comprises an identification of the second object stored in the second device, an identification of the second device, and at least one synchronization protocol which is available to be used to synchronize a first object;
a transmitting unit which transmits information on the at least one synchronization protocol which is available to be used to synchronize the first object to a control point as metadata of the first object via a Browse( ) response of a Content Directory Service (CDS) of the first device; and
a synchronizing unit of the first device which analyzes the metadata of the first object, determines the identification of the second device and the identification of the second object stored in the second device which is to be synchronized with the first object from the metadata of the first object, and synchronizes the first object and the second object according to one of the at least one synchronization protocol based on the identification of the second object and the identification of the second device without further intervention of the control point.

32. The apparatus of claim 31, further comprising a request receiving unit which receives a request to synchronize the first object from the control point,
wherein the synchronization unit synchronizes the first object and the second object in response to the request.

33. The apparatus of claim 32, wherein the request receiving unit receives a request to synchronize by receiving a message for calling a synchronization action defined in a CDS of the first device.

34. The apparatus of claim 31, wherein the synchronizing unit calls a synchronization action defined in a CDS of the second device in order for the second device to obtain update information of the first object.

35. The apparatus of claim 34, further comprising an informing unit which informs a control point that the CDS of the first device can provide the synchronization action.

36. The apparatus of claim 35, wherein the informing unit sends information as to whether the first device can provide the synchronization action to the control point using a GetFeatureList( ) response defined in the CDS of the first device.

37. The apparatus of claim 31, further comprising a Content Directory Service (CDS) of the first device which manages information on the second device with respect to the first object and information on the second object to be synchronized as the first metadata of the first object.

38. The apparatus of claim 31, wherein the first device is a first media server which stores objects, including the first object, and corresponding contents therein, and the second device is a second media server which stores objects, including the second object, and corresponding contents therein, and the first object and the second object are synchronized with each other through a communication link which directly connects the first device to the second device.

39. The apparatus of claim 31, wherein the first object and the second object are stored in the first device and the second device, respectively, prior to the synchronizing.

40. The apparatus of claim 31, wherein the metadata of the first object is attached to the first object.

* * * * *